(12) United States Patent
Sholars

(10) Patent No.: US 6,591,259 B1
(45) Date of Patent: Jul. 8, 2003

(54) METHOD AND SYSTEM FOR AUTOMATING DEPENDENT ENTITY ACTIONS IN RESPONSE TO INFORMATION CHANGE

(75) Inventor: Sheila Irene Sholars, Holister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,190

(22) Filed: Jul. 30, 1999

(51) Int. Cl.[7] .............................. G06F 17/30; H02H 3/05
(52) U.S. Cl. ............................. 707/1; 707/201; 714/48
(58) Field of Search .................... 707/100, 1–5, 707/10, 104, 500, 530, 513, 200–201; 345/736; 714/48

(56) References Cited

U.S. PATENT DOCUMENTS

| | | |
|---|---|---|
| 4,558,413 A | 12/1985 | Schmidt et al. |
| 5,226,117 A | 7/1993 | Miklos |
| 5,319,777 A | 6/1994 | Perez |
| 5,458,615 A * | 10/1995 | Klemm et al. ......... 604/103.04 |
| 5,524,193 A | 6/1996 | Covington et al. |
| 5,608,908 A * | 3/1997 | Barghouti et al. ............ 703/17 |
| 5,649,192 A | 7/1997 | Stucky |
| 5,745,669 A * | 4/1998 | Hugard et al. .................. 714/3 |
| 5,778,402 A * | 7/1998 | Gipson ........................ 707/523 |
| 5,813,007 A * | 9/1998 | Nielsen ........................ 707/10 |
| 6,349,407 B1 * | 2/2002 | Towfiq ........................ 717/170 |

FOREIGN PATENT DOCUMENTS

| | | | | |
|---|---|---|---|---|
| GB | 0917077 A2 | 5/1999 | ........... | G06F/17/60 |
| WO | WO 99/03053 | 1/1999 | ........... | G06F/17/60 |

* cited by examiner

*Primary Examiner*—Alford Kindred
(74) *Attorney, Agent, or Firm*—Sawyer Law Group LLP

(57) ABSTRACT

A method and system in accordance with the present invention provides for invoking actions when changes are made in one information source on behlaf of dependent information sources or systems. The method and system comprises identifying at least one area of high impact in the information source, identifying the action to be taken when the information changes, monitoring the at least one high impact area for at least one change, and then invoking the action responsive to the at least one change to the high impact area. In so doing, changes made to one information source can immediately cause actions to be invoked on behalf of dependent information sources or other systems. The actions invoked can be as simple as sending a notification of the changed information, or it can be as complicated as invoking a callback procedure that is defined by the dependent information source that identified the high impact area. Accordingly, through a system and method in accordance with the present invention, an environment is provided which allows for changes to quickly, accurately and automatically be reacted to for dependent information, systems and users.

33 Claims, 5 Drawing Sheets

METHOD AND SYSTEM FOR AUTOMATING DEPENDENT ENTITY ACTIONS IN RESPONSE TO INFORMATION CHANGE

FIELD OF THE INVENTION

The present invention relates generally to information stored on computer systems and more particularly to a system and method for automating dependent entity actions in response to information change.

BACKGROUND OF THE INVENTION

Typically information is displayed by a computer system in various forms. Information is displayed on screens using software programs in a variety of applications, from word processing to spread sheets. Often times this information needs to be edited as they are revised. Many times these edits are minor edits that go to specific terms. Oftentimes, though, there are certain areas of high impact that when changed, impacts other dependent entities. For example, a title of a book might be considered a high impact area and that every time that title is edited or changed, then that change affects entities such as other areas of that book or other information sources. Many times, there are macros associated with information or with a program that allows for an area of high impact to be changed consistently throughout the document. Once again, to use the book title as an example, assuming the author has decided to change or revise the title of the book in his particular document, and that book title is used in various places throughout that document, a macro could be utilized, for example, to effectuate a change by making the one change on an initial occurrence of that term but then causing the remaining occurrences to be changed to that new title.

However, those types of macros do not address the type of problem associated with information which may be either related to other information within the computer system, i.e., several other books that reference or articles that reference that particular book or book title, as well as information that is outside the computer system, such as on a network or via the Internet, that might be affected or might want to know about that change in the particular information. What is also not addressed by macros is the ability of the entity dependent on the information change to indicate the action to be taken.

Accordingly, what is needed is a system and method that allows for actions to be invoked on behalf of dependent entities in response to changes made in an information source. The actions invoked can be within or outside of the particular system where the changed information resides. The system should be easy to implement in existing computing systems. It should be cost effective, and it should not add undue complexity to such a system. The present invention addresses such a need.

SUMMARY OF THE INVENTION

A method and system in accordance with the present invention provides for invoking actions when changes are made in one information source on behalf of dependent information sources or systems. The method and system comprises identifying at least one area of high impact in the information source, identifying the action to be taken when the information changes, monitoring the at least one high impact area for at least one change, and then invoking the action responsive to the at least one change to the high impact area.

In so doing, changes made to one information source can immediately cause actions to be invoked on behalf of dependent information sources or other systems. The actions invoked can be as simple as sending a notification of the changed information, or it can be as complicated as invoking a callback procedure that is defined by the dependent information source that identified the high impact area. Accordingly, through a system and method in accordance with the present invention, an environment is provided which allows for changes to quickly, accurately and automatically be reacted to for dependent information systems and users.

DETAILED DESCRIPTION

The present invention relates to a system and method for automatically invoking actions when changes are made in an information system and associated systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention enables an action to be taken when an area within an information source changes. This provides for the ability to set up areas of the information source that are to be monitored for changes and allows one to specify what action is to be taken and when the action is to be taken when the modification occurs. A system and method in accordance with the present invention is typically implemented in software via computer readable medium in a data processing system wherein information is capable of being displayed. To more particularly describe the present invention, refer now to following discussion in conjunction with the associated figures.

Figure 1:
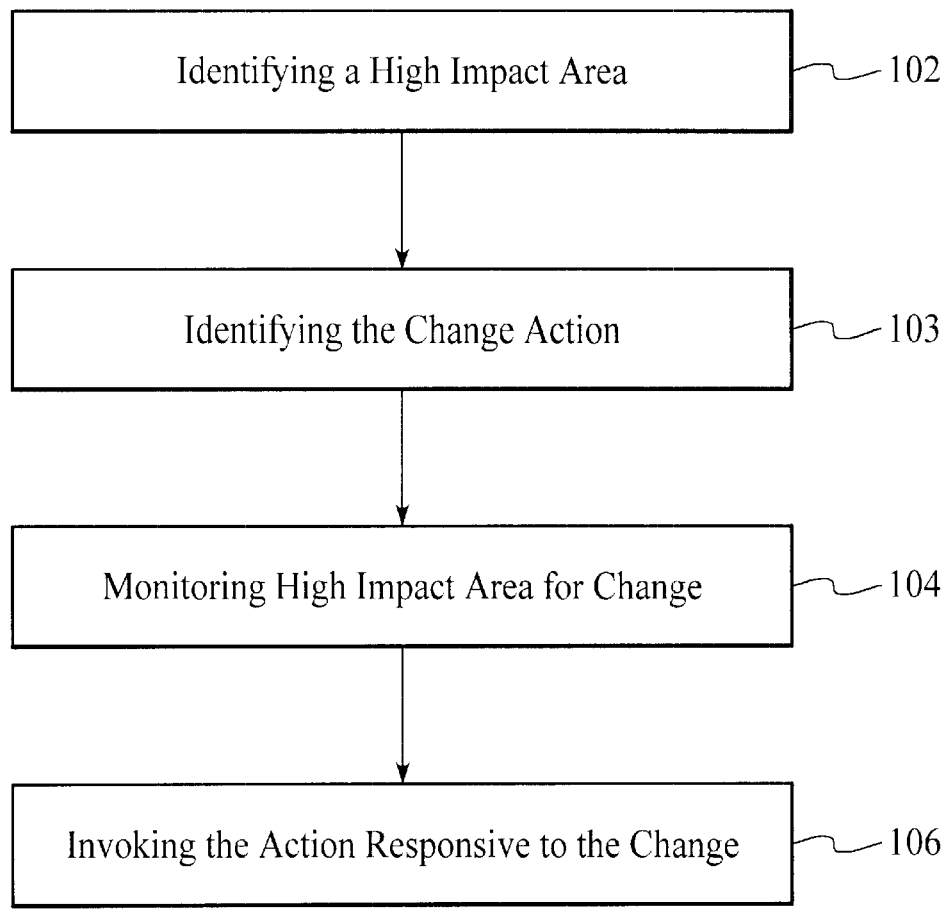
FIG. 1 is a simple flow chart illustrating a system in accordance with the present invention.

FIG. 1 is a simple flow chart 100 illustrating the operation of a system in accordance with the present invention. As is seen, first an area of high impact in an information source is identified, via step 102. Then the action to be taken when the change occurs is identified, via step 103. Next, the high impact area is monitored for any change, via step 104. Thereafter, the action is invoked responsive to the change, via step 106.

Figure 2:
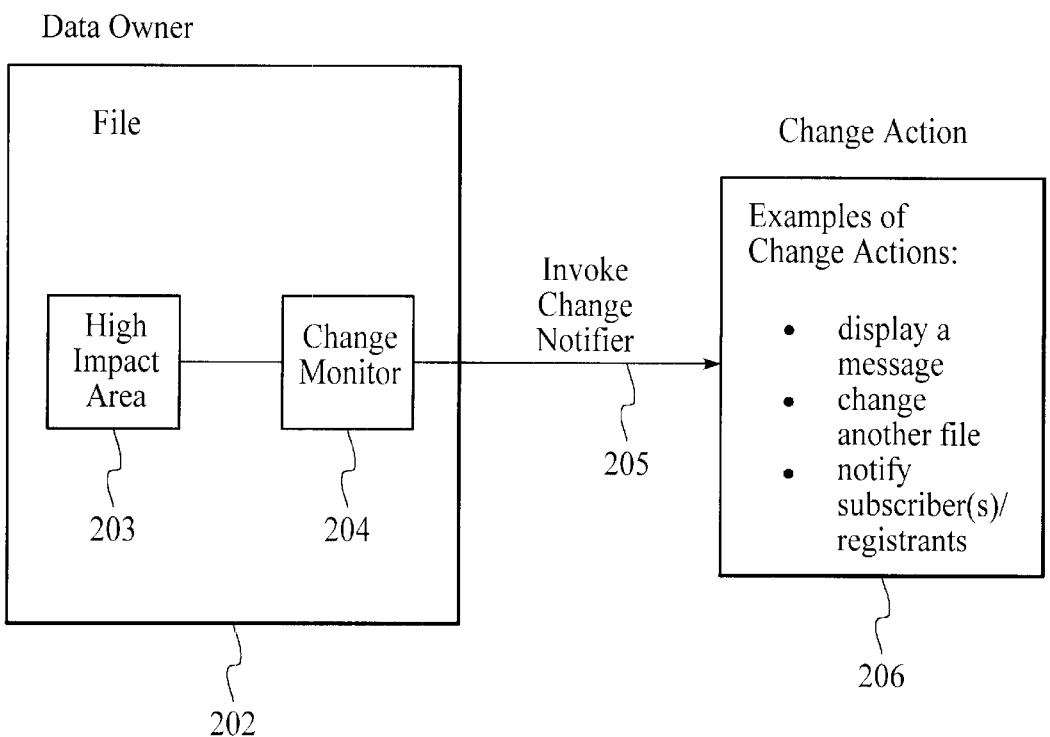
FIG. 2 is a block diagram of a system in accordance with the present invention.

A system and method in accordance with the present invention addresses this problem by providing for a mechanism for implementing the above identified flow chart. FIG. 2 is a block diagram of a system 200 in accordance with the present invention. The system 200 comprises a data owner 202 which includes a high impact area 203 and a change monitor 204 which monitors information within the high impact area 203. The system 200 further includes a change notifier signal 205 which is generated by the change monitor and executes the change action system 206.

In FIG. 2, the high impact area 203 is changed within the data owner 202. When a change occurs, the change monitor 204 determines that the high impact area 203 has been modified. The change monitor 204 initiates the change notifier signal 205. The change notifier signal 205 then invokes a change action. The change action 206 is in a preferred embodiment, an invocable module which performs the actions desired when changes occur in the high impact area 203. The change action 206 could be for example, displaying a message, changing another file or notifying a subscriber or plurality of subscribers.

Figure 3:
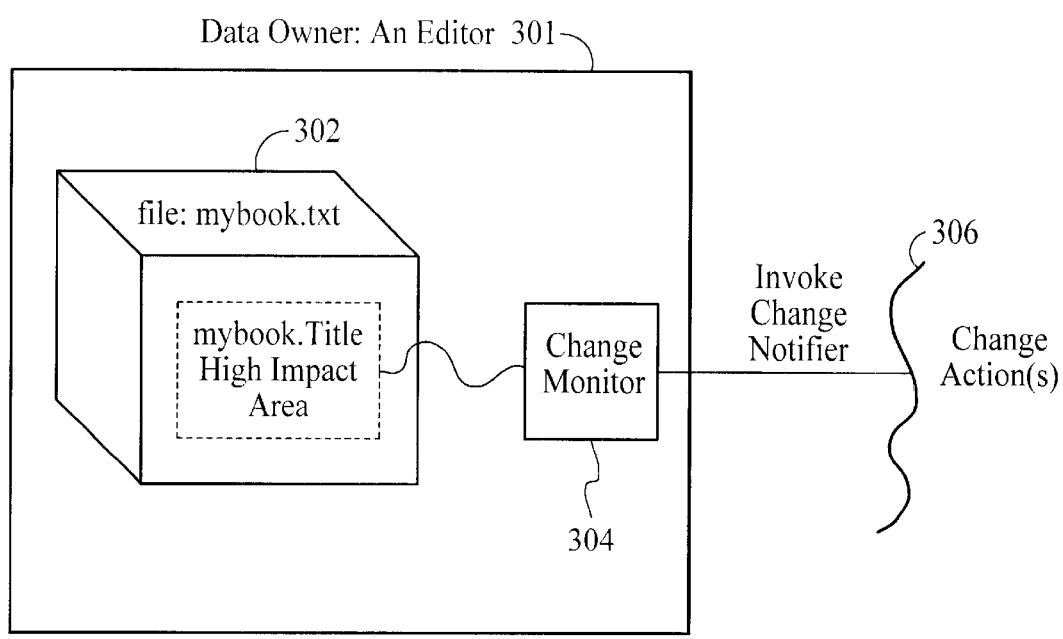
FIG. 3 is a simple diagram of a specific example of a file which could implement the present invention in a software environment.
Figure 4:
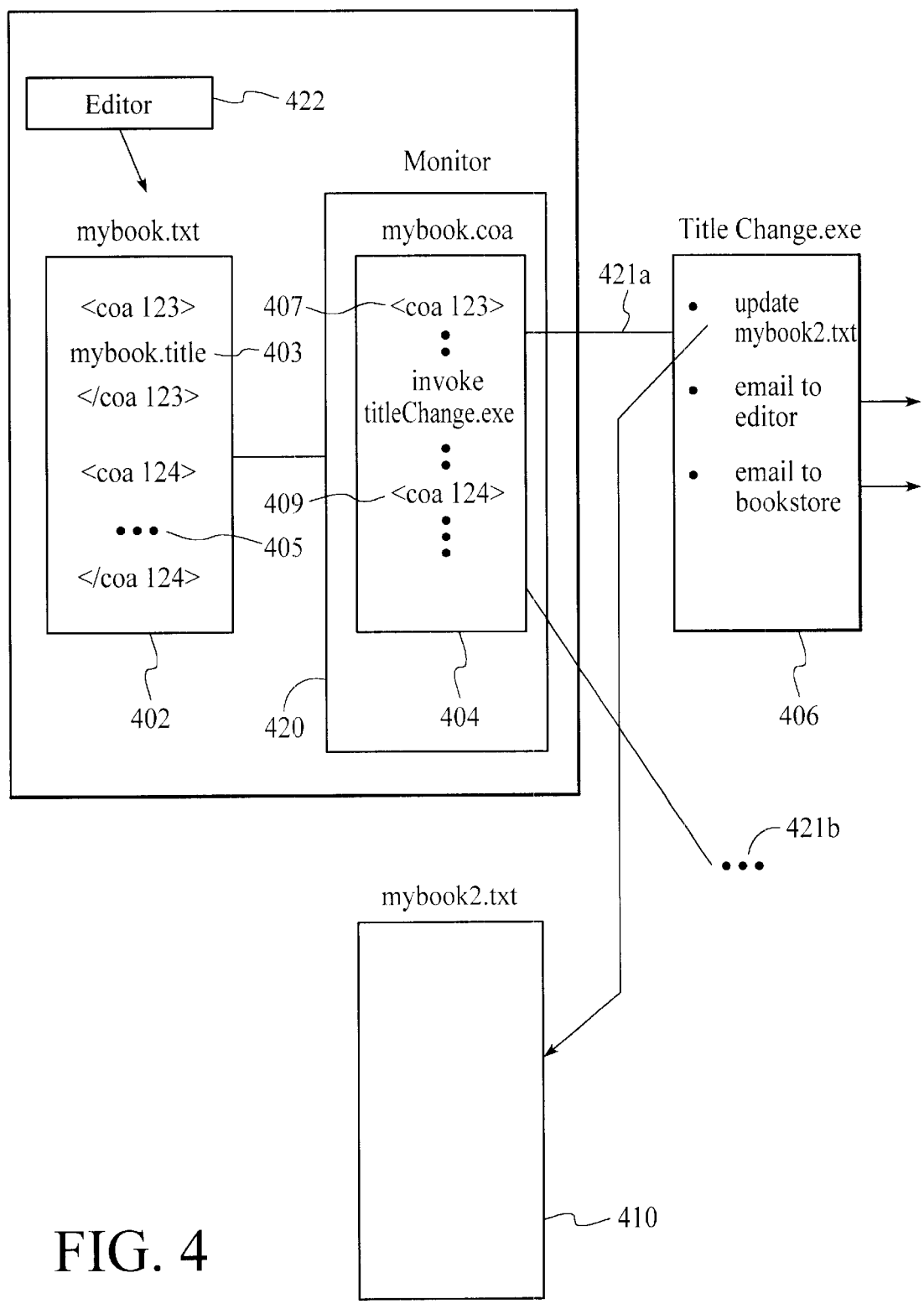
FIG. 4 is a more detailed diagram of the example of FIG. 3.

A specific implementation of the present invention is illustrated in FIGS. 3 and 4. FIG. 3 is a simple diagram of a specific example of a file which could implement the present invention in a software environment. FIG. 4 is a more detailed diagram of the example of FIG. 3.

Referring first to FIG. 3, what is shown is a file 302 which represents a "book" within the example 300. Within the file 302 is an area referred to as a mybook. Title area 303. The mybook.Title area 303 is identified to the editor 301 as a high impact area. Change action 306 is identified to be invoked as changes to the high impact area occur. The high impact area is monitored by monitor 304 which monitors for a change in the mybook. Title 303 area. When a change in mybook. Title area 303 occurs then the change action 306 is invoked. To more particularly describe this example refer now to FIG. 4 and the accompanying description.

Referring now to FIG. 4, a mybook.txt file 402 includes two high impact areas 403 and 405. A change action, TitleChange.exe, 406, has been identified to be called if high impact area 403 changes. Typically, the system 400 is initiated in a preferred embodiment by an editor 422 to determine if there are any changes in the high impact areas 403 and 405 in the document or file 402. One of ordinary skill in the art however, readily recognizes that the system can be initiated in many ways and that initiation would be within the spirit and scope of the present invention. These high impact areas are monitored by monitor 420 via tags 407 and 409. As is seen tag 403 tags mybook.title and tag 405 tags a different area in the book.

The change monitor for file mybook.txt, mybook.coa 404, initiates a change notification 421a or 421b when a change is identified by the monitor 420 in the high impact areas 403 and 405 respectively. As is seen in mybook.coa.404 there can be several actions initiated by a change in the mybook-.title including but not limited to invoking a change in the title. In this example, when a change in mybook.title has been detected by mybook.coa 404, an executable module 406 is invoked via the change notifier 421a. The module 406 can then cause user predefinable actions to occur in mybook.txt 402 or mybook2.txt 410. These actions can also include but are not limited to updating an associated web page, changing an associated file or document such as document 410, emailing a reviewer or bookstore, or performing some other user-specified action.

Although, the above-identified example has been directed to a book example, one of ordinary skill in the art readily recognizes the present invention will be utilized advantageously in a variety of environments.

Figure 5:
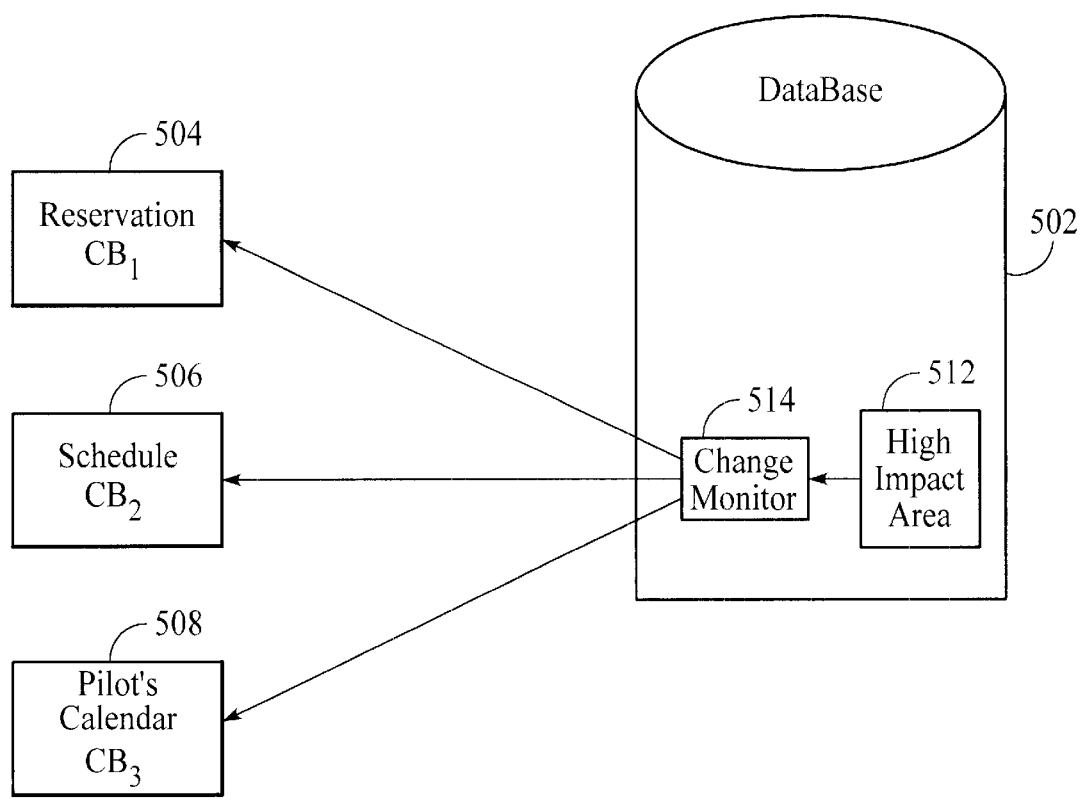
FIG. 5 is a diagram of a second specific example of a database which could implement the present invention in a software environment.

Referring now to FIG. 5, a database 502 for airline information includes a high impact area 512. The high impact area 512 affects, a reservation application 504, a flight schedule area 506 and a pilots calendar area 508. Accordingly, a modification in the high impact area (which could be a change in the flight time of a particular flight) would cause an action to be taken in the flight schedule area 506, reservation area 504 and the pilots calendar area 508. Each of the areas 504, 506, and 508 may have its own unique call-back routine which is registered with the high impact area 512. Thereafter, when a change occurs in the high impact area 512, the call back routine of the registered applications are invoked to perform the particular functions. In addition it should be understood that a change in the high impact area could initiate a plurality of actions and that would similarly be within the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for invoking actions in response to changes in a data source file, the method comprising the steps of:
   (a) identifying at least one area of high impact within the data source file, wherein the at least one area of high impact is a portion of the data source file that, when changed, affects at least one dependent entity;
   (b) identifying at least one action to invoke when the high impact area changes;
   (c) monitoring the at least one high impact area for at least one change; and
   (d) invoking the at least one action responsive to the at least one change in the at least one high impact area.

2. The method of claim 1 wherein the identifying high impact area step comprises tagging the area of high impact within the data source file.

3. The method of claim 1 wherein the identifying action step is specified by the data source file.

4. The method of claim 1 wherein the identifying action step is specified by an entity dependent on the data source file change.

5. The method of claim 1 wherein the identified action occurs within the data source file.

6. The method of claim 1 wherein the identified action is provided in another data source file associated with the data source file.

7. The method of claim 1 wherein the identified action is provided in a separate system from the data source file.

8. The method of claim 1 wherein the identified action comprises changing another data source file.

9. The method of claim 1 wherein the identified action comprises displaying a message.

10. The method of claim 1 wherein the identified action comprises notifying at least one subscriber.

11. The method of claim 1 wherein the identified action comprises invoking a callback routine.

12. A system for invoking actions in response to changes in a data source file comprising:
   (a) a data owner for identifying at least one area of high impact within the data source file, wherein the at least one one area of high impact is a portion of the data source file that, when changed, affects at least one dependent entity;

(b) means for identifying at least one action to invoke when the high impact area changes;

(c) a monitor for monitoring the at least one high impact area for at least one change; and (d) a change notifier for invoking the at least one action responsive to the at least one change in the at least one high impact area.

13. The system of claim 12 wherein the data owner includes tags for tagging the at least one area of high impact within the data source file.

14. The system of claim 12 wherein the means for identifying the action is specified by the data source file.

15. The system of claim 12 wherein the means for identifying the action is specified by an entity dependent on the data source file change.

16. The system of claim 12 wherein the identified action occurs within the data source file.

17. The system of claim 12 wherein the identified action is provided in another data source file associated with the data source file.

18. The system of claim 12 wherein the identified action is provided in a separate system from the data source file.

19. The system of claim 12 wherein the identified action comprises changing another data source file.

20. The system of claim 12 wherein the identified action comprises displaying a message.

21. The system of claim 12 wherein the identified action comprises notifying at least one subscriber.

22. The system of claim 12 wherein the identified action comprises invoking a call-back routine.

23. A computer readable medium containing program instructions for invoking actions in response to changes in a data source file, the program instructions for:

(a) identifying at least one area of high impact within the data source file, wherein the at least one area of high impact is a portion of the data source file that, when changed, affects at least one dependent entity;

(b) identifying at least one action to invoke when the high impact area changes;

(c) monitoring the at least one high impact area for at least one change; and (d) invoking the at least one action responsive to the at least one change in the at least one high impact area.

24. The computer readable medium of claim 23 wherein the program instructions for identifying the at least one high impact area comprises tagging the area of high impact within the data source file.

25. The method of claim 23 wherein the identifying action instruction is specified by the data source file.

26. The method of claim 23 wherein the identifying action instruction is specified by an entity dependent on the data source file change.

27. The computer readable medium of claim 23 wherein the identified action occurs within the data source file.

28. The computer readable medium of claim 23 wherein the identified action is provided in another data source file associated with the data source file.

29. The computer readable medium of claim 23 wherein the identified action is provided in a separate system from the data source file.

30. The computer readable medium of claim 23 wherein the identified action comprises changing another data source file.

31. The computer readable medium of claim 23 wherein the identified action comprises displaying a message.

32. The computer readable medium of claim 23 wherein the identified action comprises notifying at least one subscriber.

33. The computer readable medium of claim 23 wherein the identified action comprises invoking a call-back routine.

* * * * *